H. K. SCHRAGE.
MACHINERY FOR BALANCING OF UNSYMMETRICAL LOADS WITH POLYPHASE DISTRIBUTION NETS OR SUPPLY MAINS.
APPLICATION FILED DEC. 22, 1919.
1,354,074. Patented Sept. 28, 1920.
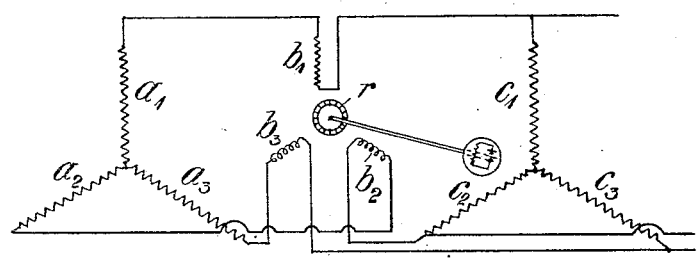
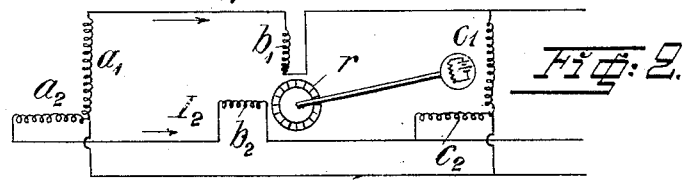
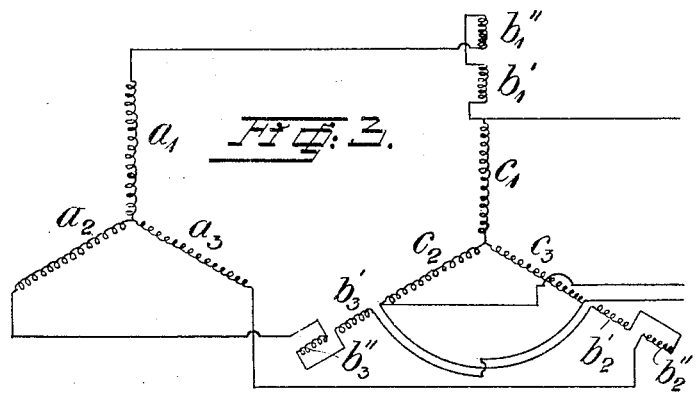
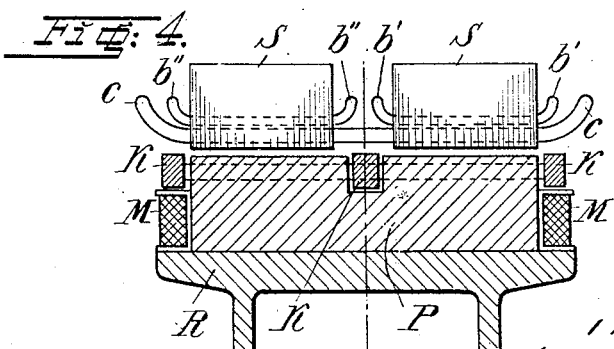
INVENTOR:
Hidde K. Schrage
By Wm Wallace White
ATTY

UNITED STATES PATENT OFFICE.

HIDDE KLAAS SCHRAGE, OF STOCKHOLM, SWEDEN.

MACHINERY FOR BALANCING OF UNSYMMETRICAL LOADS WITH POLYPHASE DISTRIBUTION-NETS OR SUPPLY-MAINS.

1,354,074.   Specification of Letters Patent.   Patented Sept. 28, 1920.

Application filed December 22, 1919. Serial No. 346,758.

*To all whom it may concern:*

Be it known that I, HIDDE KLAAS SCHRAGE, subject of the Queen of the Netherlands, residing at Malmskillnadsgatan 54, Stockholm, Sweden, have invented certain new and useful Improvements in Machinery for Balancing of Unsymmetrical Loads with Polyphase Distribution-Nets or Supply-Mains, of which the following is a specification.

Unsymmetrical or unbalanced loads in polyphase distribution nets are caused by electrical furnaces, single-phase railways, etc. Such unsymmetrical loads are very inconvenient and for this reason many power stations do not allow such unbalanced loads on their mains.

The present invention relates to a machinery for balancing unsymmetrical or balanced loads in order to take a symmetrical load from the mains.

In the drawings accompanying and forming part of this specification,—

Figure 1 is a diagrammatic view illustrating the invention, as applied to a three-phase distribution system;

Fig. 2 is a similar view illustrating the invention as applied to a two-phase distribution system;

Fig. 3 is also a diagrammatic view illustrating the windings of the balancing machine and those of the asynchronous machine on the same core; and Fig. 4 is a fragmentary, sectional view illustrating a portion of a machine embodying the invention.

Referring to Fig. 2, the reference numeral 2 designates the supply mains; $a_1$ and $a_2$ indicate the two phases of a two-phase power system. $b_1$ and $b_2$ indicate the two phases of a two-phase primary winding of an asynchronous or auxiliary induction machine, which is driven by a phase balancer comprising a synchronous machine of which $c_1$ and $c_2$ are the two phases of the armature-winding. The rotor of the asynchronous machine is driven backwardly with respect to the phase sequence of the primary currents. $r$ indicates a short-circuited rotor, which for instance may be a squirrel-cage rotor. It is a well-known fact, that by a polyphase asynchronous motor, being driven backwardly with respect to the stator currents, only a relatively low voltage will be necessary to press a symmetrical polyphase current through the primary winding of this asynchronous motor. This means that the inductive resistance or inductance of such an asynchronous motor is low for a symmetrical polyphase current. On the other hand the inductive resistance of the motor for a single phase current is large. Now it is clear why an asynchronous motor, driven backwardly, suppresses unsymmetrical currents. If for instance the asynchronous machine is driven by a synchronous machine as shown in Fig. 2, an unsymmetrical load, taken from the bus-bars, to which the synchronous machine is connected, will be balanced by this synchronous machine and only a symmetrical load will be taken from the distribution net.

Fig. 1 shows an analogous arrangement for a three phase system, the meaning of the symbols also being analogous to that in Fig. 2.

Of course, it is not necessary that the phase-balancer be a synchronous machine. As a matter of fact, it might just as well be an asynchronous machine. If the phase-balancer is a synchronous machine, it may be used for power factor compensation. In this case, it is desirable that the phase-balancer be provided with damper or like windings, making it operate as an induction machine having low impedance to the backwardly rotating component currents.

The machinery can be simplified by laying the windings $b_1$, $b_2$ and $b_3$ on the same core as $c_1$, $c_2$ and $c_3$. In this way the whole balancing machinery becomes a single machine. This arrangement is shown in Figs. 3 and 4, same symbols being used as in Fig. 1 with the difference that each phase of the winding $b_1$, $b_2$, $b_3$, is divided in two parts, for instance $b_1$, being divided in $b'_1$ and $b''_1$, etc. Fig. 4 shows how these windings are to be placed on the machine.

R is the pole-ring of the synchronous machine, P is a pole-piece, M is a field coil.

K are three short-circuit rings of a damping-winding on the rotor, which damping-winding may be a squirrel-cage winding of the normal type with the only difference that a third short-circuit-ring is placed in the middle of the rotor. The stator-core is divided in the two parts S' and S''.

$c$ indicates the three phases $c_1$, $c_2$, $c_3$.

$b'$ indicates the three phases $b'_1, b'_2, b'_3$, and $b''$ indicates the three phases $b''_1, b''_2, b''_3$.

For each of the phases $b_1, b_2$ and $b_3$ the parts $b'$ and $b''$ are series-connected in such a way that the E. M. F.'s induced in the windings $b_1, b_2, b_3$ by the fields M neutralize each other.

The short-circuit-ring in the middle of the rotor divides the damping-winding in two independent squirrel-cage windings. The influences of these two squirrel-cage windings on the windings $b'$ and $b''$ are not differential, but are added. In this way the arrangement shown in Figs. 3 and 4 works in the same manner as the arrangement shown in Figs. 1 and 2.

The rotor may have salient poles or it may have the form of a turbo-rotor.

It is not necessary that the machine is synchronous, it may also be asynchronous. In this case no winding M will be needed.

Having thus described my invention, I declare that what I claim is:

1. A system comprising polyphase supply mains, an unbalanced load therefor, an auxiliary induction machine having primary windings connected in series between said supply mains and said load and short-circuited secondary windings rotating backwardly with respect to the phase sequence of the primary currents, and a phase balancer connected in parallel with the load at a point intermediate the load and said induction machine.

2. A system comprising polyphase supply mains, an unbalanced load therefor, an auxiliary induction machine having primary windings connected in series between said supply mains and said load and short-circuited secondary windings rotating backwardly with respect to the phase sequence of the primary currents, and a phase balancer connected in parallel with the load at a point intermediate the load and said induction machine, said phase balancer having a damper winding.

3. A system comprising polyphase supply mains, an unbalanced load therefor, a balancing machine, an asynchronous machine rotating backwardly with respect to the phase sequence of its primary currents and mechanically connected to said balancing machine, the unbalanced load being connected to the terminals of the balancing machine and the latter in turn connected to the mains in such manner that the primary phase windings of the asynchronous machine are between the mains and the balancing machine.

4. A system as set forth in claim 3, the balancing machine and the asynchronous machine being combined in a single machine.

In witness whereof I have hereunto set my hand in presence of two witnesses.

HIDDE KLAAS SCHRAGE.

Witnesses:
 Aug. Hagelin,
 Elsa Johanson.